(12) United States Patent
Hagiwara (10) Patent No.: US 8,958,099 B2
(45) Date of Patent: Feb. 17, 2015

(54) INFORMATION PROCESSING SYSTEM THAT SETS INFORMATION IN A REGISTRY OF A CLIENT TERMINAL IN ACCORDANCE WITH SETTING INFORMATION SENT BY A MANAGEMENT TERMINAL

(71) Applicant: Oki Data Corporation, Tokyo (JP)

(72) Inventor: Suguru Hagiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 84 days.

(21) Appl. No.: 13/787,866

(22) Filed: Mar. 7, 2013

(65) Prior Publication Data

US 2013/0235423 A1    Sep. 12, 2013

(30) Foreign Application Priority Data

Mar. 8, 2012    (JP) ................................. 2012-052325

(51) Int. Cl.
*G06F 3/12*    (2006.01)
*H04L 29/06*    (2006.01)

(52) U.S. Cl.
CPC .............. *G06F 3/1224* (2013.01); *H04L 67/42* (2013.01); *G06F 3/1204* (2013.01); *G06F 3/1288* (2013.01)
USPC ........................... 358/1.15; 358/1.9; 358/1.16

(58) Field of Classification Search
USPC .................................................. 358/1.1–3.29
See application file for complete search history.

(56) References Cited

U.S. PATENT DOCUMENTS

2011/0069341 A1*   3/2011   Kim et al. .................... 358/1.15

FOREIGN PATENT DOCUMENTS

JP            2006-127218 A       5/2006

\* cited by examiner

*Primary Examiner* — Benny Q Tieu
*Assistant Examiner* — Marcellus Augustin
(74) *Attorney, Agent, or Firm* — Marvin A. Motsenbocker; Mots Law, PLLC (57) ABSTRACT

An information processing system includes a management terminal and a client terminal capable of communicating with each other. The client terminal includes a first controller configured to issue an instruction to perform first certain processing according to first setting information. The management terminal includes a setting information generator configured to generate the first setting information according to information inputted by a user operation, and a setting information application unit configured to, upon detection of a client terminal capable of performing communication, send the first setting information generated by the setting information generator to the client terminal and applies the generated first setting information to the first setting information set in the first controller.

11 Claims, 13 Drawing Sheets

FIG.13

INFORMATION PROCESSING SYSTEM THAT SETS INFORMATION IN A REGISTRY OF A CLIENT TERMINAL IN ACCORDANCE WITH SETTING INFORMATION SENT BY A MANAGEMENT TERMINAL

CROSS REFERENCE TO RELATED APPLICATIONS

This application claims priority based on 35 USC 119 from prior Japanese Patent Application No. 2012-052325 filed on Mar. 8, 2012, the entire contents of which are incorporated herein by reference.

BACKGROUND OF THE INVENTION

1. Field of the Invention

The disclosure relates to an information processing system in which a management terminal and a client terminal are connected to each other in a manner capable of communicating with each other. The disclosure also relates to a print system in which a management terminal, a client terminal, and a printer are connected to one another in a manner capable of communicating with one another.

2. Description of the Related Art

Generally, in order for a printer connected to a client terminal to print by using the printer driver software (referred to below as a "printer driver"), it is necessary to install an optimal printer driver for the printer in the client terminal.

In a conventional print system (see paragraphs [0018] to [0034] and FIG. 3 of Japanese Patent Application Publication No. 2006-127218, for example), an information processor to which at least one or more printers are connectable acquires information on options and resource information from a desired printer, writes the information in a printer driver, and installs the printer driver.

SUMMARY OF THE INVENTION

However, rules and regulations for using a printer are often set particularly in an environment such as an office, a school, or the like where a network involves many users. In such an environment, the conventional technique has a problem in that each user is required to customize, in accordance with the rules and regulations, print settings (print information settings) of the printer driver installed in the client terminal which serves as a printer controller.

An embodiment of the invention aims to solve such a problem, and has an objective to simplify the management of print settings in a client terminal.

An aspect of the invention is an information processing system in which a management terminal and a client terminal are connected to each other in a manner capable of communicating with each other. The client terminal includes a first controller configured to issue an instruction to perform a first certain processing according to first setting information. The management terminal includes: a setting information generator configured to generate the first setting information according to information inputted by a user operation, and a setting information application unit configured to, upon detection of a client terminal capable of performing communication, send the first setting information generated by the first setting information generator to the client terminal, and then apply the generated first setting information to the first setting information set in the first controller.

According to the aspect described above, it is possible to simplify the management of settings (e.g., print settings) in a client terminal.

DETAILED DESCRIPTION OF EMBODIMENTS

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, a description is given of embodiments of a print system of the invention with reference to the drawings.

Figure 2:
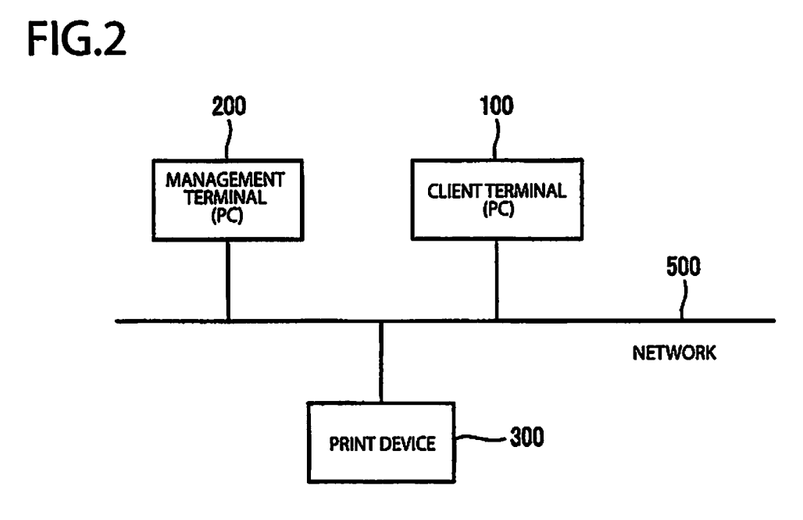
FIG. 2 is a block diagram showing a schematic configuration of the print system of the first embodiment.

FIG. 2 is a block diagram showing a schematic configuration of a print system of a first embodiment.

In FIG. 2, the print system includes client terminal (PC: Personal Computer) 100, management terminal (PC) 200, and print device 300 such as a printer. These components are connected through network 500 in a manner such that they are capable of communicating with one another. In the print system, print setting information on client terminal 100 is set through management terminal 200. Note that a printer driver (software), as a printer controller of print device 300, is installed in client terminal 100.

Figure 1:
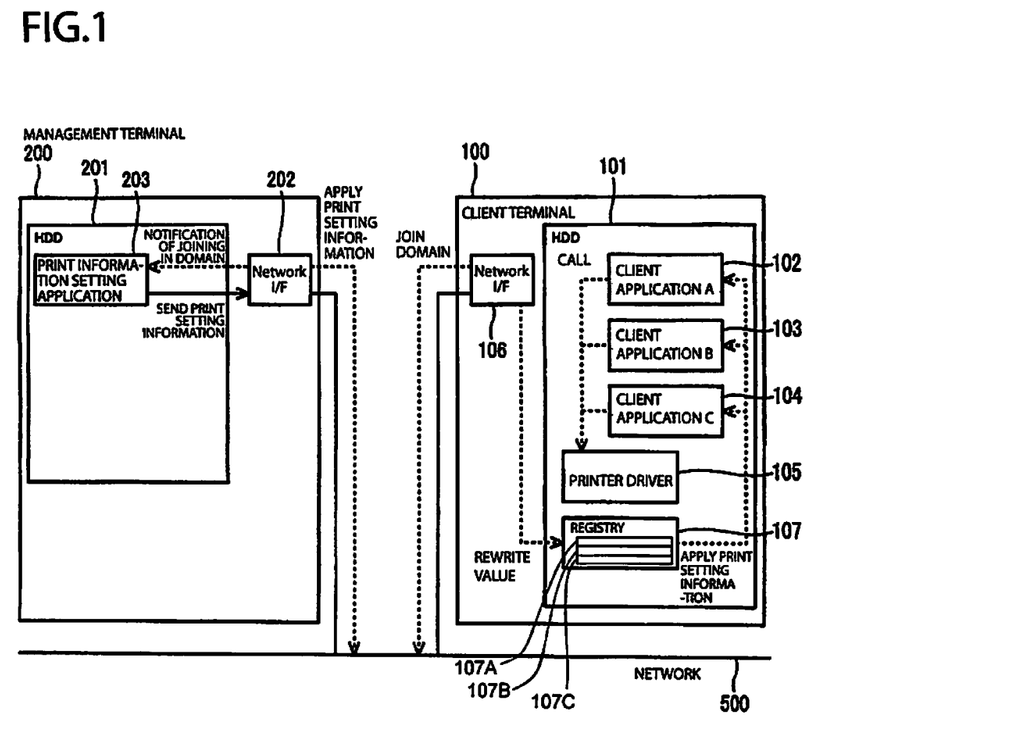
FIG. 1 is a block diagram showing a detailed configuration of a print system of a first embodiment.

FIG. 1 is a block diagram showing a detailed configuration of the print system of the first embodiment. A configuration for setting the print setting information in the client terminal through the management terminal is described on the basis of FIG. 1. Note that configurations of the print system other than the configuration of setting print setting information are not directly related to the invention, and thus descriptions thereof are omitted.

In FIG. 1, client terminal 100 is formed of HDD (Hard Disk Drive) 101 and Network I/F 106. HDD 101 stores therein client application (software) A102, client application (software) B103, client application (software) C104, printer driver 105, and registry 107.

Management terminal 200 is formed of HDD 201 and Network I/F 202. HDD 201 stores therein print information setting application (software) 203.

Client terminal 100 and management terminal 200 communicate with each other through network 500 by using Network I/F 106 of client terminal 100 and Network I/F 202 of management terminal 200.

Print information setting application 203 stored in HDD 201 of management terminal 200 is software for setting and generating print setting information to be set in client terminal 100, and for applying the information to client terminal 100. Operations of print information setting application 203 are described later.

Print information setting application 203 continuously monitors client terminal 100 in a domain. When client terminal 100 joins the domain managed by management terminal 200 through network 500, print information setting application 203 detects the newly-joined client terminal 100.

Upon detection of client terminal 100, print information setting application 203 sends the generated print setting information to detected client terminal 100, and performs processing to apply the information to client terminal 100.

Print setting information sent to client terminal 100 is sent through network 500, and reaches registry 107 via Network I/F 106 of client terminal 100. The print setting information sent to registry 107 is replaced with the already-stored print setting information, and is newly stored in registry 107. Here, registry 107 is a setting information group that includes values which define print setting information for specifying the print operations of print device 300 shown in FIG. 2.

Thus, the print setting information stored in registry 107 is rewritten by use of the print setting information sent from print information setting application 203 of management terminal 200. Consequently, when printer driver 105 is called by one of client application A 102, client application B 103, or client application C 104 in client terminal 100 at the time of printing, printer driver 105 is activated by referring to the print setting information in registry 107. This means that printer driver 105 is activated by referring to the print setting information sent from management terminal 200. Hence, the print setting information sent from management terminal 200 is applied to client terminal 100 for each piece of application software.

Note that in registry 107, print setting information can be set for each piece of the document generation application software.

To be specific, registry 107 includes: registry 107A for application A which is a registry for client application A 102, registry 107B for application B which is a registry for client application B 103, and registry 107C for application C which is a registry for client application C 109.

Printer driver 105 performs printing by issuing a print instruction to print device 300 shown in FIG. 2, according to print setting information which specifies print operations of print device 300. At the time of startup, printer driver 105 acquires print setting information values defined in registry 107 and applies them to the print setting information.

Figure 3:
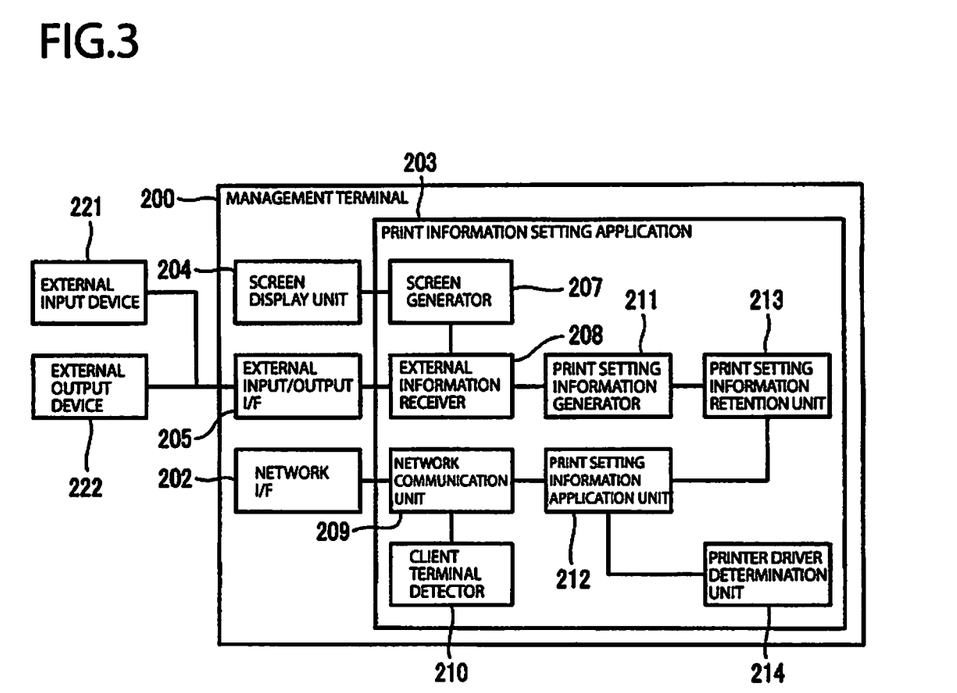
FIG. 3 is a block diagram showing a configuration of a print information setting application of a management terminal of the first embodiment.

FIG. 3 is a block diagram showing a configuration of the print information setting application of the management terminal of the first embodiment. Processing units in the print information setting application are described on the basis of FIG. 3.

In FIG. 3, external input device 221 is an input unit such as an operation unit for inputting user requests to management terminal 200, and external output device 222 is an output unit such as a display unit for displaying various kinds of information to transmit to a user.

When a user request is inputted from external input device 221 and sent to management terminal 200, the request is reported to external information receiver 208 in print information setting application 203 via external input/output I/F 205 of management terminal 200.

External information receiver 208 notifies screen generator 207 or print setting information generator 211 of the reported user request.

When notified of the user request for displaying a screen of print information setting application 203, screen generator 207 generates a main screen of print information setting application 203, and notifies screen display unit 204 in management terminal 200 of the main-screen display request.

When notified of the main-screen display request, screen display unit 204 displays, through external output device 222, a main screen. The main screen is an interface for performing the input and output of information between print information setting application 203 and the user.

Print setting information generator 211 generates print setting information according to information inputted through user operation. When notified of the print setting information inputted as a user request, print setting information generator 211 analyzes the print setting information and generates print setting information as information to be applied to client terminal 100. The print setting information generated by print setting information generator 211 is stored and retained in print setting information retention unit 213.

Here, printer driver determination unit 214 determines the driver to which the print setting information generated in print setting information generator 211 is to be applied. At this time, if there is an item for which the printer driver does not have a function, then printer driver determination unit 214 determines not to apply the print setting information. In this case, the printing is performed under default settings which are determined from information preset in the printer.

The print setting information that printer driver determination unit 214 determines to apply to a printer driver is sent to print setting information application unit 212, and is then sent to a client terminal via network communication unit 209 and Network I/F 202.

Meanwhile, when the print setting information is sent via network communication unit 209 and Network I/F 202, client terminal detector 210 thereby detects that a new client terminal has joined the domain managed by management terminal 200.

When client terminal detector 210 detects a client terminal capable of performing communication, print setting information application unit 212 sends the client terminal the print setting information generated by print setting information generator 211. The client terminal then applies this information to the print setting information set in the printer driver.

A description is next given of the effects of the configuration described above.

Figure 4:
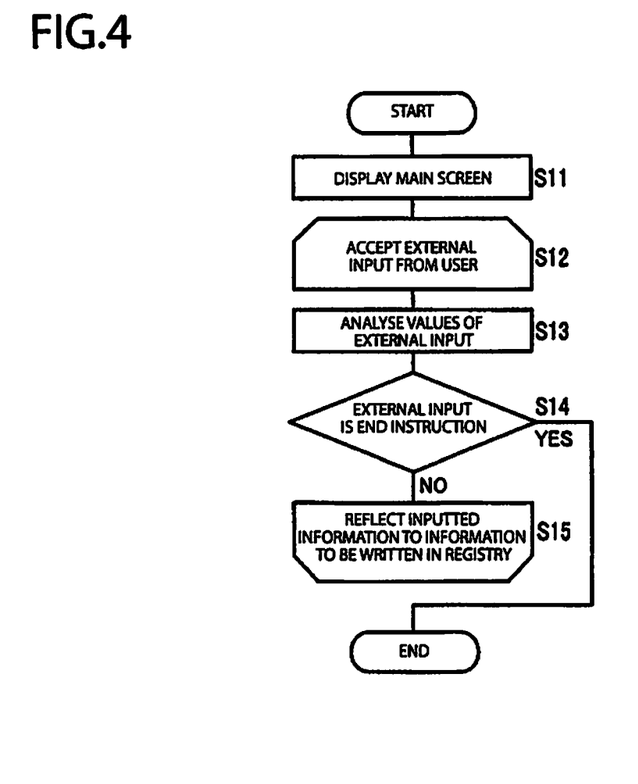
FIG. 4 is a flowchart showing a flow of the main screen display processing performed in the first embodiment.

Firstly, the main screen display processing performed by the print information setting application of the management terminal is described with reference to FIG. 3, in accordance with steps S in the flowchart of FIG. 4 which shows a flow of the main screen display processing performed in the first embodiment.

The main screen display processing is started when the user requests, through external input device 221, management terminal 200 to display a main screen of print information setting application 203.

S11: When notified of the user request for displaying the screen of print information setting application 203 via external input/output I/F 205 and external information receiver 208, screen generator 207 generates the main screen of print information setting application 203, and notifies screen display unit 209 in management terminal 200 of the main screen display request.

When notified of the main screen display request, screen display unit 204 displays, through external output device 222, the main screen. The main screen serves as an interface for performing input and output of information between print information setting application 203 and the user.

Figure 7:
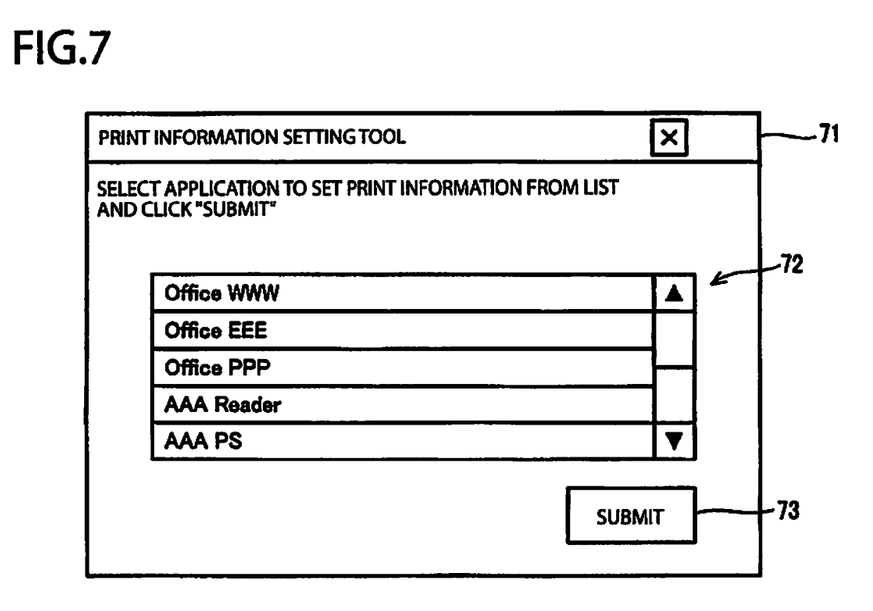
FIG. 7 is an explanatory view of a main screen used in the first embodiment.

Here, the main screen of print information setting application 203 to be displayed is screen 71 shown in FIG. 7, for example. In this screen, a list 72 of application (software) names, as print setting information, is displayed in a selectable manner, and when set button 73 is pushed, a print information setting screen is displayed.

Figure 8:
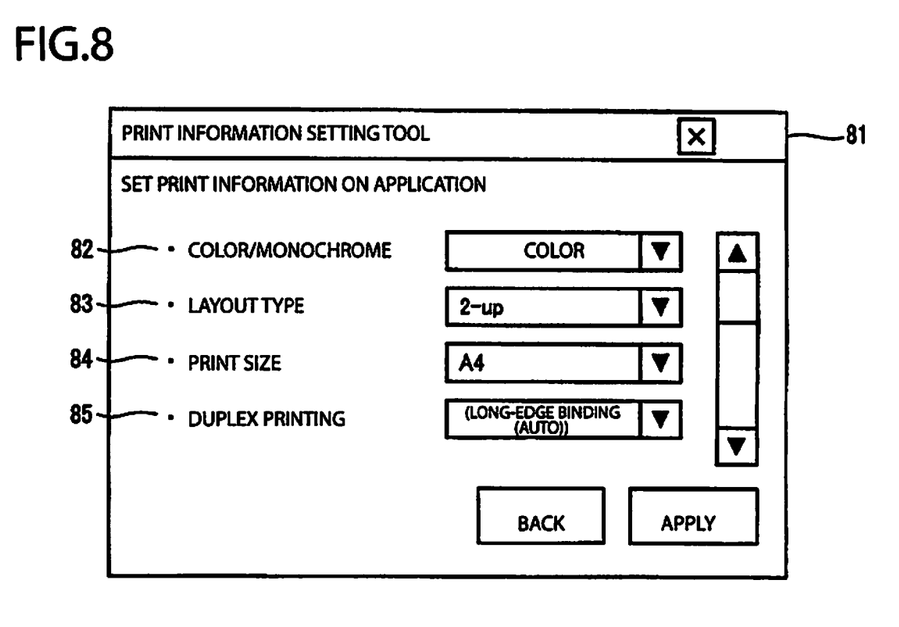
FIG. 8 is another explanatory view of the main screen used in the first embodiment.

The print information setting screen is print information setting screen 81 shown in FIG. 8, for example. This screen accepts operations to set, as print setting information on the application (software) selected in screen 71 of FIG. 7. These operations are, for example, color/monochrome 82 for specifying the print color, layout type 83 for specifying the number of pages to be printed on a sheet, print size 84 for specifying the size of the sheet, duplex printing 85 for selecting between duplex printing and simplex printing, and the like.

S12: The main screen is the interface for performing the input and output of information between print information setting application 203 and the user. When the user sets print setting information through the main screen, external input device 221 having accepted the input operation of this setting notifies external information receiver 208 in print information setting application 203 of information, such as the print setting information inputted as a user request. This notification is transmitted via external input/output I/F 205 of management terminal 200.

S13: External information receiver 208 receives the user request (information such as print setting information) as an external input, and notifies print setting information generator 211 of the information, such as the print setting information, inputted as a user request.

Upon being notified of a user request (notified user request) print setting information generator 211 analyzes the externally inputted notified user request. If the user request is print setting information, print setting information generator 211 generates print setting information to be applied to the client terminal according to the print setting information inputted by the user operation, i.e., the values specifying print operations of the print device.

S14: If the notified user request as an external input is an instruction to end print information setting application 203, print setting information generator 211 ends print information setting application 203, and if not, the processing proceeds to S15.

S15: Print setting information generator 211 reflects the generated print setting information as information to be written in the registry of the client terminal, and retains this information in print setting information retention unit 213. The processing proceeds to S12, and the processing of S12 to S14 is repeated.

Note that if application A ("Office WWW" in the first embodiment) is selected from list 72 of application names in FIG. 7 and print setting information is set therefor, information to be written in registry 107A for client application A included in registry 107 of client terminal 100 is retained in print setting information retention unit 213.

Similarly, if application B ("Office EEE" in the first embodiment) is selected from list 72 of application names in FIG. 7 and print setting information is set therefor, information to be written in registry 107B for client application B included in registry 107 of client terminal 100 is retained in print setting information retention unit 213.

Figure 5:
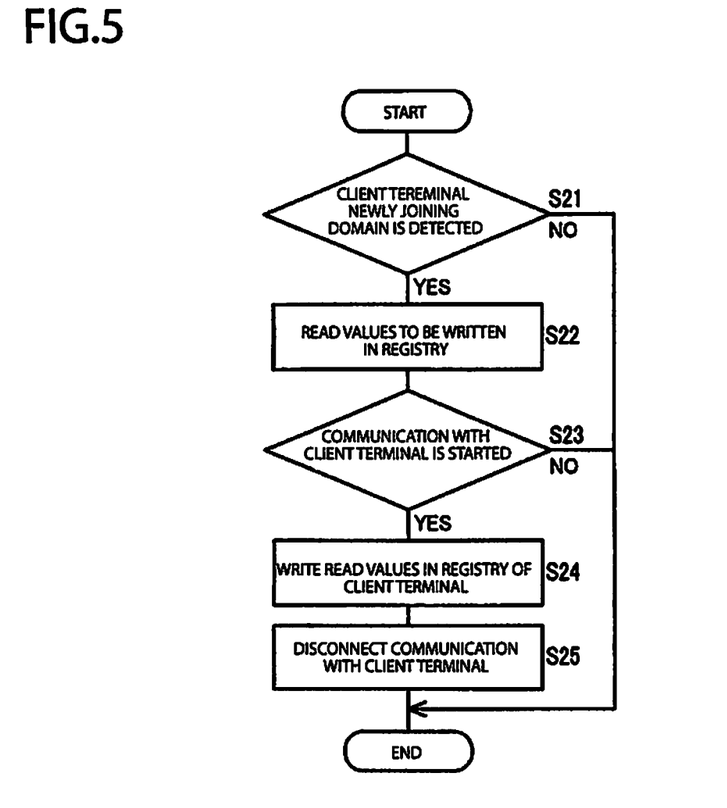
FIG. 5 is a flowchart showing a flow of the print setting information write processing performed in the first embodiment.

Next, print setting information write processing performed by the print information setting application of the management terminal is described with reference to FIGS. 1 and 3, and in accordance with steps S in the flowchart of FIG. 5 which shows a flow of the print setting information write processing performed in the first embodiment.

The print setting information write processing is started when client terminal 100 joins a domain managed by management terminal 200.

Specifically, if client terminal 100 is not in the domain managed by management terminal 200 when print setting information is retained in print setting information retention unit 213, the print setting information is retained in print setting information retention unit 213 until the client terminal joins the domain managed by the management terminal 200.

Meanwhile, if client terminal 100 is in the domain managed by management terminal 200 when print setting information is retained in print setting information retention unit 213, the print setting information write processing is started immediately.

S21: When client terminal detector 210 in management terminal 200 detects, via network communication unit 209 and Network I/F 202, that client terminal 100 has joined the domain, the processing proceeds to S22, and if not, the processing is ended.

S22: Print setting information application unit 212 reads, from print setting information retention unit 213, print setting information as values to be written in registry 107 of client terminal 100 which has joined the domain.

S23: After reading the print setting information, print setting information application unit 212 communicates with client terminal 100 via network communication unit 209 and Network I/F 202. If the communication fails, the processing is ended. If the communication is started, the processing proceeds to S24.

S24: After starting the communication with client terminal 100, print setting information application unit 212 sends client terminal 100 an instruction to write the values of the print setting information read in S22 in registry 107 of client terminal 100. The instruction is sent via network communication unit 209 and Network I/F 202.

Client terminal 100 writes the values of the print setting information received via Network I/F 106 in registry 107.

S25: Upon completion of the transmission, network communication unit 209 of management terminal 200 disconnects the communication with client terminal 100 and the processing is ended.

Next, printer driver activation processing performed by the client terminal is described with reference to FIG. 1, in accordance with steps S in the flowchart of FIG. 6 which shows a flow of the printer driver activation processing performed in the first embodiment.

The printer driver activation processing is started when client application A 102, client application B 103, or client application C 104 in client terminal 100 receives a print instruction and calls printer driver 105.

S31: When client application A 102, client application B 103, or client application C 104 in client terminal 100 receives the print order and calls printer driver 105, printer driver 105 acquires values of print setting information written in registry 107.

To be specific, when client application A 102 receives the print order and calls printer driver 105, printer driver 105 acquires values of print setting information written in registry 107A for application A.

When client application B 103 receives the print order and calls printer driver 105, printer driver 105 acquires values of print setting information written in registry 107B for application B.

When client application C 104 receives the print order and calls printer driver 105, printer driver 105 acquires values of print setting information written in registry 107C for application C.

S32: Printer driver 105 is activated according to the values of the print setting information acquired from registry 107, and the activation processing is ended. Client terminal 100 performs printing by applying the acquired print setting information.

Thus, by applying the print setting information to the client terminal, it is possible to change the print setting information set in the printer driver previously installed in the client terminal to the print setting information inputted to the management terminal.

Moreover, since print setting information set in the client terminal which joins the domain managed by the management terminal is to be changed, it is possible to apply the print setting information set in the management terminal, i.e., to apply the print setting information that the administrator desires to the client terminal, every time the client terminal logs in to the domain environment.

Furthermore, values in the registry of the client terminal are to be rewritten according to the print setting information inputted to the management terminal. Thus, when the document generation application software installed in the client terminal activates the printer driver, the printer driver applies the print setting information according to the values in the registry. Accordingly, it is possible to apply different types of print setting information to different pieces of application software.

As has been described, the first embodiment is advantageous in that it is possible to change the print setting information set in the printer driver previously installed in the client terminal, and to print in accordance with the setting information inputted to the management terminal.

The first embodiment is also advantageous in that it is possible to apply the print setting information set in the management terminal, i.e., the print setting information that the administrator desires for the client terminal, every time the client terminal logs in to the domain environment.

The first embodiment is also advantageous in that it is possible to apply different types of print setting information to different pieces of document generation application software installed in the client terminal.

Second Embodiment

In a configuration of a second embodiment, multiple client terminals are in a domain managed by a management terminal. Note that portions similar to the aforementioned first embodiment are assigned the same reference numerals and descriptions thereof are omitted.

Figure 9:
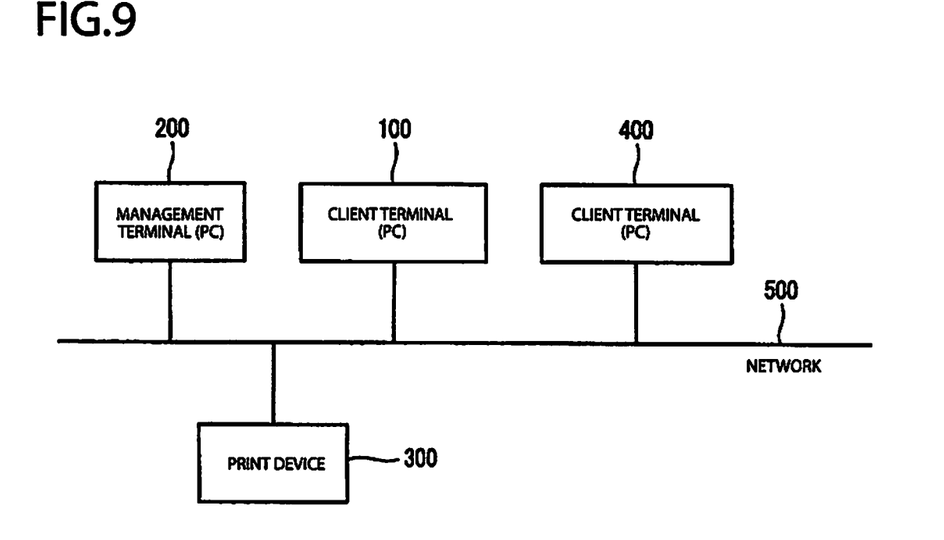
FIG. 9 is a block diagram showing a schematic configuration of a print system of a second embodiment.

FIG. 9 is a block diagram showing a schematic configuration of a print system of the second embodiment.

In FIG. 9, the print system includes client terminal (PC) 100, client terminal (PC) 400, management terminal (PC) 200, and print device 300 such as a printer. The system components are connected through network 500 in a manner capable of communicating with one another. Note that a printer driver (software) as a printer controller of print device 300 is installed in client terminal 100 and client terminal 400.

Figure 10:
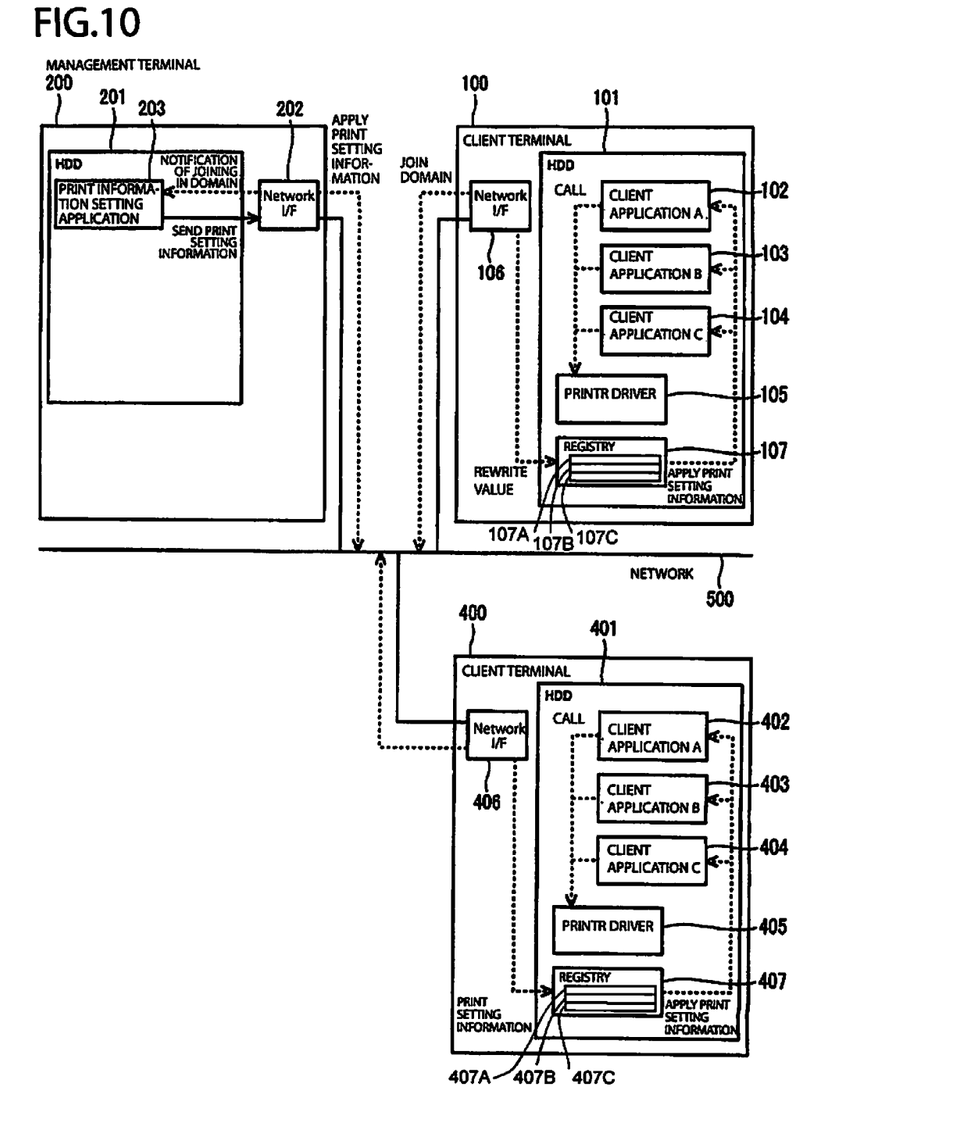
FIG. 10 is a block diagram showing a detailed configuration of the print system of the second embodiment.

FIG. 10 is a block diagram showing a detailed configuration of the print system of the second embodiment. A configuration for setting print setting information in the client terminal through the management terminal is described on the basis of FIG. 10. Note that configurations other than the configuration for setting print setting information are not directly related to the invention, and thus descriptions thereof are omitted.

In FIG. 10, as in the case of client terminal 100, client terminal 400 is formed of HDD 401 and Network I/F 406. HDD 401 stores therein client application (software) A402, client application (software) B403, client application (software) C404, printer driver 405, and registry 407. Note that communication among the terminals is performed in a manner similar to the first embodiment.

In the second embodiment, print information setting application 203 in management terminal 200 acquires print setting information retained in registry 107 in client terminal 100, and applies the print setting information to client terminal 400. Registry 407 includes registry 407A for application A, registry 407B for application B, and registry 407C for application C. Note that the configuration of print information setting application 203 is similar to that of the first embodiment shown in FIG. 3.

A description is next given of the effects of the configuration described above.

Figure 11:
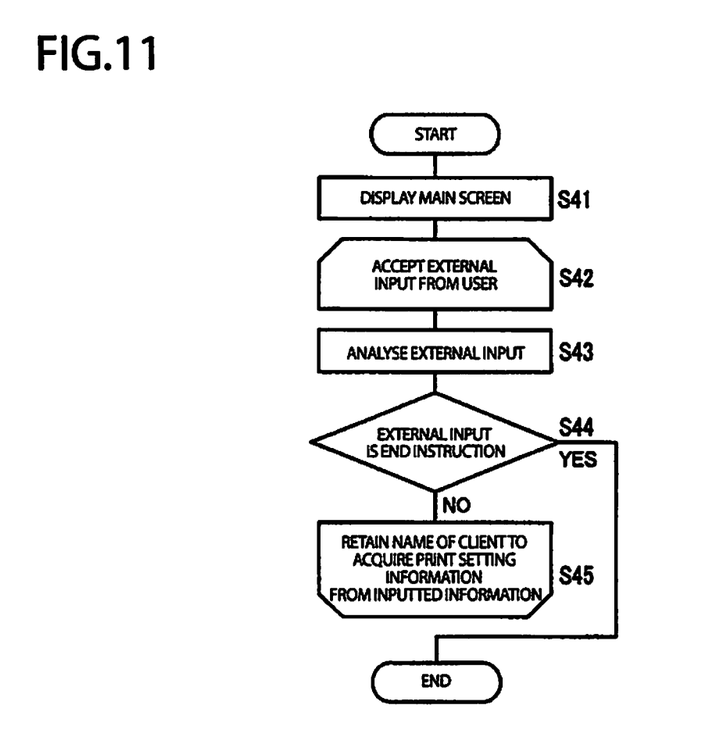
FIG. 11 is a flowchart showing a flow of the image display processing performed in the second embodiment.

Firstly, the main screen display processing performed by the print information setting application of the management terminal is described with reference to FIG. 3, and in accordance with steps S in the flowchart of FIG. 11 which shows a flow of the main screen display processing performed in the second embodiment.

The main screen display processing is started when the user requests, through external input device 221, management terminal 200 to display a main screen of print information setting application 203.

S41: When notified of the user request for displaying the screen of print information setting application 203 via external input/output I/F 205 and external information receiver 208, screen generator 207 generates the main screen of print information setting application 203, and notifies screen display unit 204 in management terminal 200 of the main screen display request.

When notified of the main screen display request, screen display unit 204 displays, through external output device 222, the main screen. In this manner, the main screen is an interface for performing input and output of information between print information setting application 203 and the user.

Figure 13:
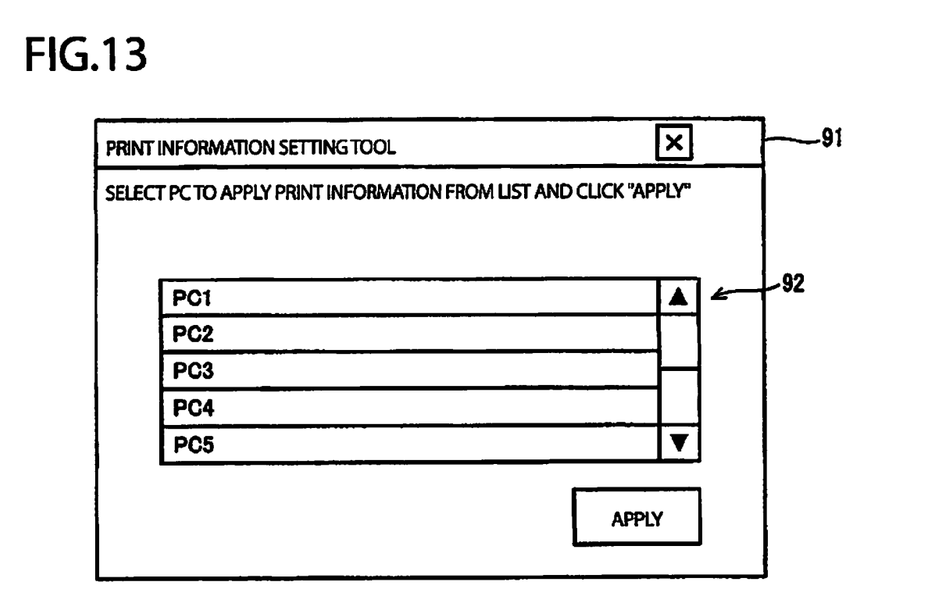
FIG. 13 is an explanatory view of a main screen used in the second embodiment.

Here, the main screen of print information setting application 203 to be displayed is screen 91 shown in FIG. 13, for example. In this screen, a list 92 of names of client terminals to acquire print setting information is displayed in a selectable manner.

S42: When the user selects a client terminal through the main screen, which is the interface for performing input and output of information between print information setting application 203 and the user, external input device 221 having accepted the input operation of this selection notifies external information receiver 208 in print information setting application 203 of the client terminal name inputted as a user request. This notification is transmitted via external input/output I/F 205 of management terminal 200.

S43: External information receiver 208 receives the notification on information such as the client terminal name, and notifies print setting information generator 211 of the information such as the client terminal name inputted as a user request.

S44: If the notified user request as an external input is an instruction to end print information setting application 203, print setting information generator 211 ends print information setting application 203, and if not, the processing proceeds to S45.

S45: Print setting information generator 211 retains the notified client terminal name as the name of the client terminal to acquire the print setting information in print setting information retention unit 213. The processing proceeds to S42, and processing of S42 to S44 is repeated.

Figure 12:
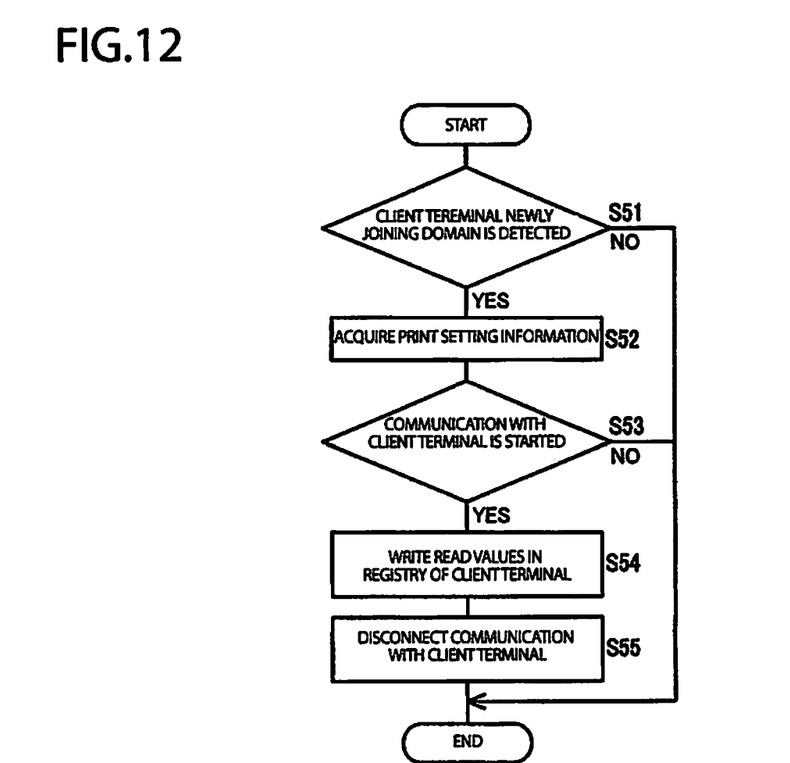
FIG. 12 is a flowchart showing a flow of the print setting information write processing performed in the second embodiment.

Next, print setting information write processing performed by the print information setting application of the management terminal is described with reference to FIGS. 3 and 10, in accordance with steps S in the flowchart of FIG. 12 which shows a flow of the print setting information write processing performed in the second embodiment.

The print setting information write processing is started when a client terminal newly joins a domain managed by management terminal 200. The second embodiment describes an example where client terminal 400 newly joins the domain and print setting information set in client terminal 100 is applied to client terminal 400.

S51: When client terminal detector 210 in management terminal 200 detects, via network communication unit 209 and Network I/F 202, that client terminal 400 has joined the domain, the processing proceeds to S52, and if not, the processing is ended.

S52: Print setting information application unit 212 acquires, according to the client terminal name retained in print setting information retention unit 213 in steps S45 of FIG. 11 described above, the print setting information defined in the registry of this client terminal (client terminal 100 in the second embodiment) via network communication unit 209 and Network I/F 202, and retains the acquired print setting information in print setting information retention unit 213.

Print setting information application unit 212 reads, from print setting information retention unit 213, print setting information to be written in registry 407 of client terminal 400 which has joined the domain.

S53: After reading the print setting information, print setting information application unit 212 communicates with client terminal 400 via network communication unit 209 and Network I/F 202. If the communication fails, the processing is ended. If the communication is started, the processing proceeds to S54.

S54: After starting the communication with client terminal 400, print setting information application unit 212 sends client terminal 400 an instruction to write the values of the print setting information acquired in steps S52 in registry 407 of client terminal 400. The instruction is sent via network communication unit 209 and Network I/F 202.

Client terminal 400 writes the values of the print setting information received via Network I/F 406 in registry 407, and applies them to the print setting information.

S55: Upon completion of the transmission, network communication unit 209 of management terminal 200 disconnects the communication with client terminal 400 and the processing is ended.

Figure 6:
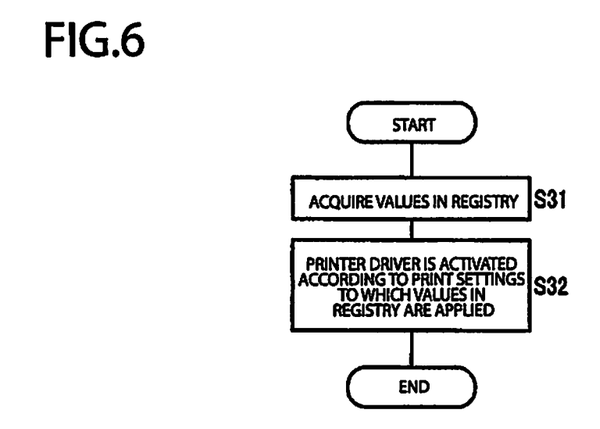
FIG. 6 is a flowchart showing a flow of the printer driver activation processing performed in the first embodiment.

Since the printer driver activation processing performed by the client terminal is similar to that of the first embodiment shown in FIG. 6, description thereof is omitted.

As has been described, in addition to the effects of the first embodiment, the second embodiment is advantageous in that it is possible to apply the print setting information set in a first client terminal, which is already in the domain environment managed by the management terminal, to a second client terminal in the domain environment, when the second client terminal re-joins the domain.

The second embodiment is also advantageous in that it is possible to automatically apply print setting information appropriate for the domain environment to a client terminal which newly joins the domain environment.

Note that the invention is applicable to an environment such as an office and a school where client terminals used by multiple users are connected to a printer. The invention is also applicable to an environment where users (client terminals) are managed in a network.

Moreover, the invention is not limited to a print system, but is applicable to various types of general information processing systems.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An information processing system in which a management terminal and a client terminal are connected to each other in a manner capable of communicating with each other, wherein:

the client terminal comprises
    a first controller configured to issue an instruction to perform a first certain processing according to first setting information; and
the management terminal comprises
    a setting information generator configured to generate the first setting information according to information inputted by a user operation, and
    a setting information application unit configured to, upon detection of the client terminal being capable of performing communication, send the first setting information generated by the first setting information generator to the client terminal and for the client terminal to write the generated first setting information as the first setting information set in the first controller,
wherein:
the client terminal comprises a second controller configured to issue an instruction to perform second certain processing according to second setting information;
the setting information generator generates the second setting information according to information inputted by a user operation; and
the setting information application unit, upon detection of the client terminal capable of performing communication, sends the second setting information generated by the setting information generator to the client terminal and to write the generated second setting information as the second setting information set in the second controller,
wherein:
the client terminal comprises a registry where to define the first setting information specifying an operation in the first certain processing and the second setting information specifying an operation in the second certain processing; and the setting information application unit registers the first setting information and the second setting information in the registry.

2. The information processing system according to claim 1, wherein:
the client terminal comprises a registry where to define the first setting information specifying an operation in the first certain processing; and
the setting information application unit of the management terminal registers the first setting information in the registry.

3. The information processing system according to claim 2, wherein the first controller is a first application.

4. The information processing system according to claim 3, wherein at a time of startup of the first controller, the first controller acquires the first setting information defined in the registry.

5. The information processing system according to claim 4, wherein:
the setting information generator acquires the first setting information defined in the registry from a client terminal identified by a client terminal name inputted by a user operation; and
upon detection of a second client terminal capable of performing communication, the setting information application unit sends the first setting information to the second client terminal and applies the first setting information to the first setting information in the registry.

6. The information processing system according to claim 1, wherein
the first controller is a first application, and
the second controller is a second application.

7. The information processing system according to claim 6, wherein:
at the time of startup of the first controller, the first controller acquires the first setting information defined in the registry; and
at the time of startup of the second controller, the second controller acquires the second setting information defined in the registry.

8. The information processing system according to claim 7, wherein:
the system further includes a printer connected with the client terminal in a manner such that the printer and the client terminal are capable of communicating with each other;
the operation of the first certain processing relates to a print operation of the printer; and
the operation of the second certain processing also relates to a print operation of the printer.

9. The information processing system according to claim 8, wherein:
the first controller sends an instruction to perform the first certain processing according to the first setting information to the printer; and
the second controller sends an instruction to perform the second certain processing according to the second setting information to the printer.

10. The information processing system according to claim 9, wherein the setting information generator generates the first setting information and the second setting information on the basis of values which specify the print operations of the printer and which are inputted by a user operation.

11. The information processing system according to claim 1, wherein the first setting information comprises print setting information, wherein the user operation corresponds to a print selection instruction, and wherein the first certain processing comprises a display screen setting condition indicating connectable devices data setting.

* * * * *